Feb. 24, 1931.  V. VALLETTA  1,794,263

RADIATOR FOR MOTOR VEHICLES

Filed July 8, 1929   2 Sheets-Sheet 1

Inventor
Vittorio Valletta,
By Henry Ort
atty.

Feb. 24, 1931. V. VALLETTA 1,794,263
RADIATOR FOR MOTOR VEHICLES
Filed July 8, 1929 2 Sheets-Sheet 2

Patented Feb. 24, 1931

1,794,263

UNITED STATES PATENT OFFICE

VITTORIO VALLETTA, OF TURIN, ITALY, ASSIGNOR TO FIAT SOCIETÁ ANONIMA, OF TURIN, ITALY

RADIATOR FOR MOTOR VEHICLES

Application filed July 8, 1929, Serial No. 376,759, and in Italy June 7, 1929.

This invention relates to the kind of radiators formed by a plurality of corrugated strips of thin metal sheet assembled together in such a way as a form zig-zag conduits for the flow of water and conduits for the flow of air in a direction which is perpendicular to the direction in which the water flows.

The improvement forming the object of this invention has the purpose to produce a whirling motion in the current of air passing in said conduits promoting the heat exchange between the air and the wall along which it flows. The wall of each strip is provided for this purpose with one or more projections preferably arranged in staggered relation to the projections on the adjacent wall extending slightly beyond the edge formed by said two adjacent walls and situated externally of the water flow.

The annexed drawing shows by way of example a constructional form of the invention.

Figure 1:
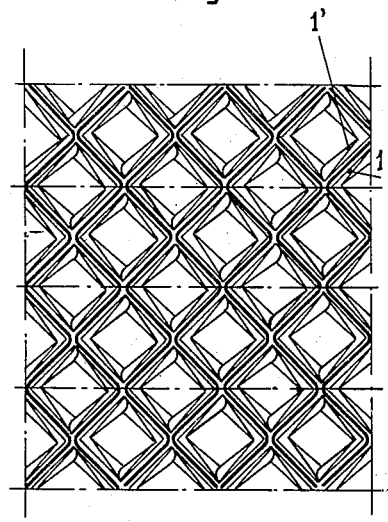
Figure 3:
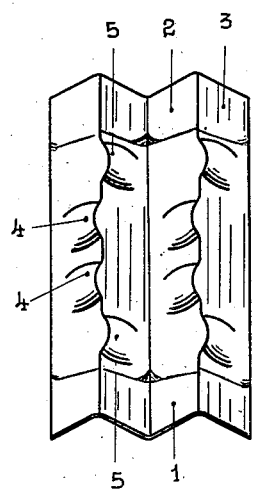
Figure 4:
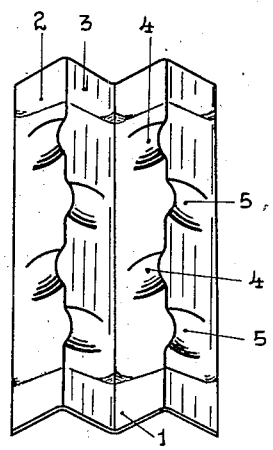
Figure 2:
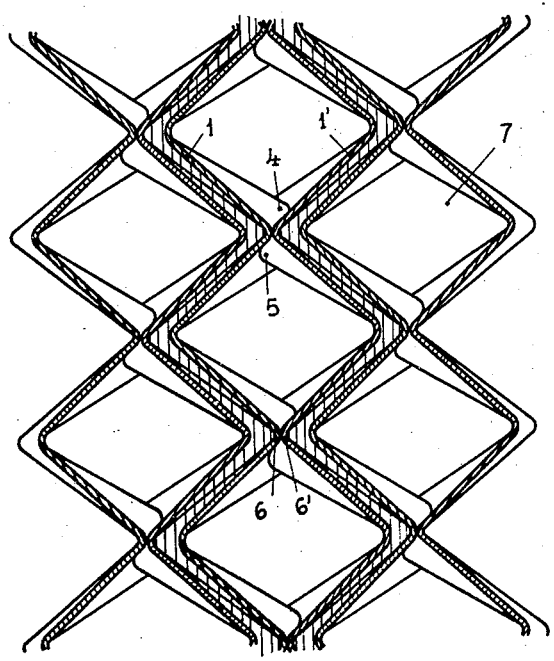

Fig. 1 shows in front view a radiator section of the mentioned kind;—Fig. 2 is an enlarged detail vertical section of the radiator. Figs. 3 and 4 are perspective views of two strips slightly different from each other.

Referring to the drawing, 1 and 1' denote two metal sheet strips having equal zig-zag corrugations and forming once assembled a water conduit. Each wall 2, 3 of said strips and more particularly the outer portion thereof coming into contact with the air carries projections 4 and 5 preferably arranged in staggered relation in the two adjacent elements and extending slightly beyond the edge 6 formed by two adjacent walls. Each of said walls is provided with one or a plurality of such projections, which can be more or less prominent and are obtained for instance by punching, stamping, etc.

Figs. 3 and 4 show two different staggered arrangements of the projections on one wall relatively to the projections on the adjacent wall. By assembling a plurality of strips the air conduits 7 are obtained.

It will be seen that the projections 4 and 5 highly improve the action of the radiator as the air flowing through the conduits 7 having a rectilinear axis finds a resistance when passing the curved sections formed by the projections, which generates a strong whirling motion promoting the heat exchange between the air and the walls along which it passes.

A further advantage of this arrangement is that the projections 4 and 5 of each pair of oppositely situated strips form a stop in the longitudinal direction for the edges 6, 6', so that said strips will not slide relatively to each other after they have been brought together, thus making assembling easier and improving the conditions in which it may be effected.

What I claim is:

1. Radiator for motor vehicles comprising elements formed by sheet metal strips bent in zig-zag shape and connected two by two at their vertical longitudinal edges to form water conduits, the pairs of strips thus connected being placed side by side in order to form the air conduits and transverse projections formed on the walls of said air conduits in order to generate whirling motions of the air flowing along said conduits, said projections extending beyond the adjacent edge of the oppositely situated strips so as to work as holding members for retaining the strips in position during their assemblage.

2. Radiator for motor vehicles comprising elements formed by sheet metal strips bent in zig-zag shape and connected two by two at their vertical longitudinal edges to form water conduits, the pairs of strips thus connected being placed side by side in order to form the air conduits, transverse projections formed on one wall of said conduits and other projections arranged in staggered relation to the former on the adjacent walls, said projections being adapted to generate whirling motions of the air flowing along said conduits and extending beyond the adjacent edge of the oppositely situated strip in order to work as holding members for holding said strips in position during their assemblage.

In testimony that I claim the foregoing as my invention, I have signed my name.

VITTORIO VALLETTA.